United States Patent [19]

Walling

[11] Patent Number: 4,476,923

[45] Date of Patent: Oct. 16, 1984

[54] FLEXIBLE TUBING PRODUCTION SYSTEM FOR WELL INSTALLATION

[76] Inventor: John B. Walling, 5613 Trail Lake Dr., Fort Worth, Tex. 76133

[21] Appl. No.: 359,477

[22] Filed: Mar. 18, 1982

Related U.S. Application Data

[63] Continuation-in-part of Ser. No. 170,610, Jul. 21, 1980, Pat. No. 4,336,415.

[51] Int. Cl.³ .............................................. E21B 43/00
[52] U.S. Cl. .................................. 166/65 R; 166/105; 166/68; 417/404
[58] Field of Search ....................... 166/68, 65 R, 68.5, 166/105; 417/404, 390, 422, 368, 372

[56] References Cited

U.S. PATENT DOCUMENTS

| | | | |
|---|---|---|---|
| 2,245,501 | 6/1941 | Richardson | 417/403 |
| 2,748,358 | 5/1956 | Johnston | 339/16 |
| 2,751,144 | 6/1956 | Troendle | 417/404 |
| 3,165,155 | 1/1965 | Leathers et al. | 166/84 |
| 3,234,723 | 2/1966 | Brown | 57/149 |
| 3,526,086 | 9/1970 | Morgan | 174/47 X |
| 3,568,771 | 3/1971 | Vincent et al. | 160/65 R |
| 3,807,502 | 4/1974 | Heilhecker et al. | 166/315 |
| 4,024,913 | 5/1977 | Grable | 166/72 |
| 4,234,295 | 11/1980 | Jensen | 417/390 |
| 4,262,742 | 4/1981 | James | 166/84 |
| 4,295,801 | 10/1981 | Bennett | 417/390 |
| 4,336,415 | 6/1982 | Walling | 174/47 |

FOREIGN PATENT DOCUMENTS

| | | | |
|---|---|---|---|
| 490726 | 8/1938 | United Kingdom | 417/403 |
| 625024 | 9/1978 | U.S.S.R. | 417/422 |

Primary Examiner—William F. Pate, III
Assistant Examiner—Hoang C. Dang
Attorney, Agent, or Firm—Dennis T. Griggs

[57] ABSTRACT

An improved system for lifting formation fluid from a well bore to a surface facility is disclosed. Rigid production tubing and sucker rods are replaced by flexible, composite production tubing in which a production conduit, power conductors, signal conductors, hydraulic/pneumatic conduits and a load-bearing tension member are enclosed by a flexible, tubular covering. The load-bearing member of the flexible production tubing is mechanically coupled to a submersible pump. The pump includes driving means such as an electrical motor, hydraulic motor or pneumatic motor which is driven downhole by electrical or hydraulic/pneumatic power transmitted through auxiliary conduits in the flexible production tubing. The flexible production tubing is wound about a truck-mounted reel for convenient transport to and from a well site. A submersible pump is attached to the end of the flexible tubing and is played out from the reel through the well casing to the producing formation. Withdrawal of the pump from the well is accomplished by taking up the flexible production tubing around the truck-mounted reel.

1 Claim, 5 Drawing Figures

FLEXIBLE TUBING PRODUCTION SYSTEM FOR WELL INSTALLATION

CROSS-REFERENCE TO RELATED APPLICATION

This application is a continuation-in-part of U.S. application Ser. No. 170,610 filed July 21, 1980 now U.S. Pat. No. 4,336,415.

BACKGROUND OF THE INVENTION

1. Field of the Invention

This invention relates generally to well production equipment, and in particular to a well production system employing flexible tubing.

2. Description of the Prior Art

Various types of artificial lifts are used to bring liquids to the surface of the earth when the pressure of the liquid-bearing reservoir is insufficient to produce the formation fluids by natural means. The pumping motion of the artificial lift may originate at the surface of the ground, or below, as a result of the application of electrical or fluid power to a subsurface pump. In the usual surface powered rig, a reciprocating pump element at the bottom of the well is mechanically actuated by a walking beam pivotally mounted on a Sampson post and connected at one end to a sucker rod string and at the other end to a prime mover which supplies power through a Pitman gear for producing reciprocating motion.

Generally, in the surface powered rig, the prime mover consists of an internal combustion engine or electrical motor. The cost of this prime mover, as well as its operation and maintenance is, in many instances, a significant economic factor in the production of liquids from subterranean liquid-bearing reservoirs. The sucker rod is characterized by a short, fast stroke resulting in low pump efficiency, high power consumption and low recovery rates.

An additional limitation of surface-powered rigs which operate a sucker rod through rigid production tubing is that, for practical purposes, the weight of the sucker rod for wells having a producing formation at about 10,000 feet or deeper is excessive, resulting in stretching and early failure of the rods. Moreover, the sucker rod assembly is subjected to severe wear in slant-hole or crooked-hole wells. In slant-hole wells of the type typically drilled offshore, the sucker rod is subjected to severe frictional wear because of the slant of the hole, and is therefore subject to early failure and requires frequent replacement. Frictional wear is also a serious problem in crooked holes in which the well bore follows a helical path. Because of the difficulty of drilling a vertical well at other than shallow depth, effective use of the sucker rod pumping assembly is substantially limited to shallow wells.

For the foregoing reasons, there has been considerable interest in improving pumping systems in which the motive force is provided by electrical or pneumatic/hydraulic power applied to a subsurface pump, thereby eliminating the sucker rods and affording precise control of the pumping action.

Submersible pumps of the type in which the motive force is derived from electrical, hydraulic or pneumatic power applied downhole represent a significant improvement over the reciprocating sucker rod approach. According to conventional practice, the submersible pump which is driven downhole by the electrical/hydraulic or pneumatic driving means is supported at the end of a long string of rigid production tubing joints which are coupled to each other by pin and box connections. Power conductors, signal conductors and hydraulic/pneumatic conduits are bundled together in an external umbilical cable assembly supported by the rigid production tubing joints, and are coupled to the downhole pump.

The rigid tubing installations must be worked over from time to time due to either faulty downhole equipment or to some other unusual or adverse well condition. For example, if the production string is damaged or leaking, it may be necessary to pull the production tubing and umbilical from the casing and replace the damaged section.

When such service operations become necessary, a portable installation called a work-over rig is brought to the well site and set up. Generally, these rigs consist of a heavy derrick or mast which support work pulleys or block-and-tackle arrangements which are operable to pull the pipe string from the well. The work-over rigs are heavy and difficult to erect and must be capable of lifting the substantial load imposed by the rigid production pipe string.

An overriding concern in the operation of a producing well is to get the necessary equipment into and out of the well as rapidly and safely as economically possible. The efficiency of the pipe handling operation depends upon such factors as the running speed of the hoist rig, the time required to make up or break a tool joint during stabbing operations, the time required to mechanically couple and decouple the hoist rig and the pipe string, and the time required to transport the length of pipe from the pipe string to a storage station during recovery operations and to transport a length of pipe from the storage station to the pipe string during launching operations.

As the length of the rigid pipe string increases to reach the producing formation of deep wells, the cost of providing and operating rigid pipestring equipment becomes a significant factor. Moreover, the weight of rigid pipestrings and handling equipment becomes a limiting factor in offshore installations.

OBJECTS OF THE INVENTION

It is, therefore, the principal object of the present invention to provide a flexible tubing production system in which rigid production tubing and sucker rods are totally eliminated.

A related object of the invention is to provide a relatively lightweight, high strength flexible tubing production system which can be injected into and recovered from a well bore without the assistance of a pipe handling hoist rig.

Yet another object of the invention is to provide a flexible tubing production system which utilizes a high tensile strength flexible production tubing member which can be transported, deployed and recovered by a truck-mounted reel.

Still another object of the invention is to provide a well production system having downhole electrohydraulic pump which is capable of sustained operation at relatively high power levels.

Another object of the invention is to provide a well production system in which the pumping rate may be adjusted and closely controlled by electronic means located in a surface facility.

SUMMARY OF THE INVENTION

An improved system for lifting formation fluid from a well bore to a surface facility is disclosed. Rigid production tubing and sucker rods are totally eliminated and replaced by flexible, composite production tubing in which a production conduit, power conductors, signal conductors, hydraulic/pneumatic conduits and a load-bearing tension member are enclosed by a flexible, tubular covering. The load-bearing member of the flexible production tubing is mechanically coupled to a submersible pump. The pump includes driving means such as an electrical motor, hydraulic motor or pneumatic motor which is driven downhole by electrical or hydraulic/pneumatic power transmitted through auxiliary conduits in the flexible production tubing. The flexible production tubing is wound about a truck-mounted reel for convenient transport to and from a well site. A submersible pump is attached to the end of the flexible tubing and is played out from the reel through the well casing to the producing formation. Recovery of the pump and flexible tubing from the well is accomplished by taking up the flexible production tubing around the truck-mounted reel.

In a preferred embodiment, the flexible production tubing is coupled to a double-acting electro-hydraulic piston pump in which a hydraulically actuated power piston drives a production piston. Hydraulic power is developed internally within the downhole pump housing by a hydraulic pump which draws hydraulic power fluid from a reservoir within the pump housing. The pump is driven mechanically by an electrical motor which is received within the pump housing. The drive motor is energized electrically from the surface through power conductors which extend from a surface facility to the pump through the flexible, composite tubing member.

According to one embodiment, electrical power is conducted downhole at relatively high frequency to avoid line losses. In this arrangement, the motor is driven at a constant, high speed, with its output being reduced through a gear drive assembly connected between the pump and the motor.

In an alternate arrangement, the downhole electric drive motor is driven by a cycloconverter whose operating frequency is variable over a wide frequency range.

Sustained operation at relatively high power levels is made possible by an improved heat dissipation arrangement in which the electrical drive motor and pump are received within the power fluid reservoir of the pump assembly, and are cooled by circulation of the spent hydraulic power fluid. The hydraulic power fluid is continuously circulated through auxiliary conduits to a surface facility where it is filtered and temperature controlled through a heat exchanger.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

DETAILED DESCRIPTION OF THE PREFERRED EMBODIMENTS

Figure 1:
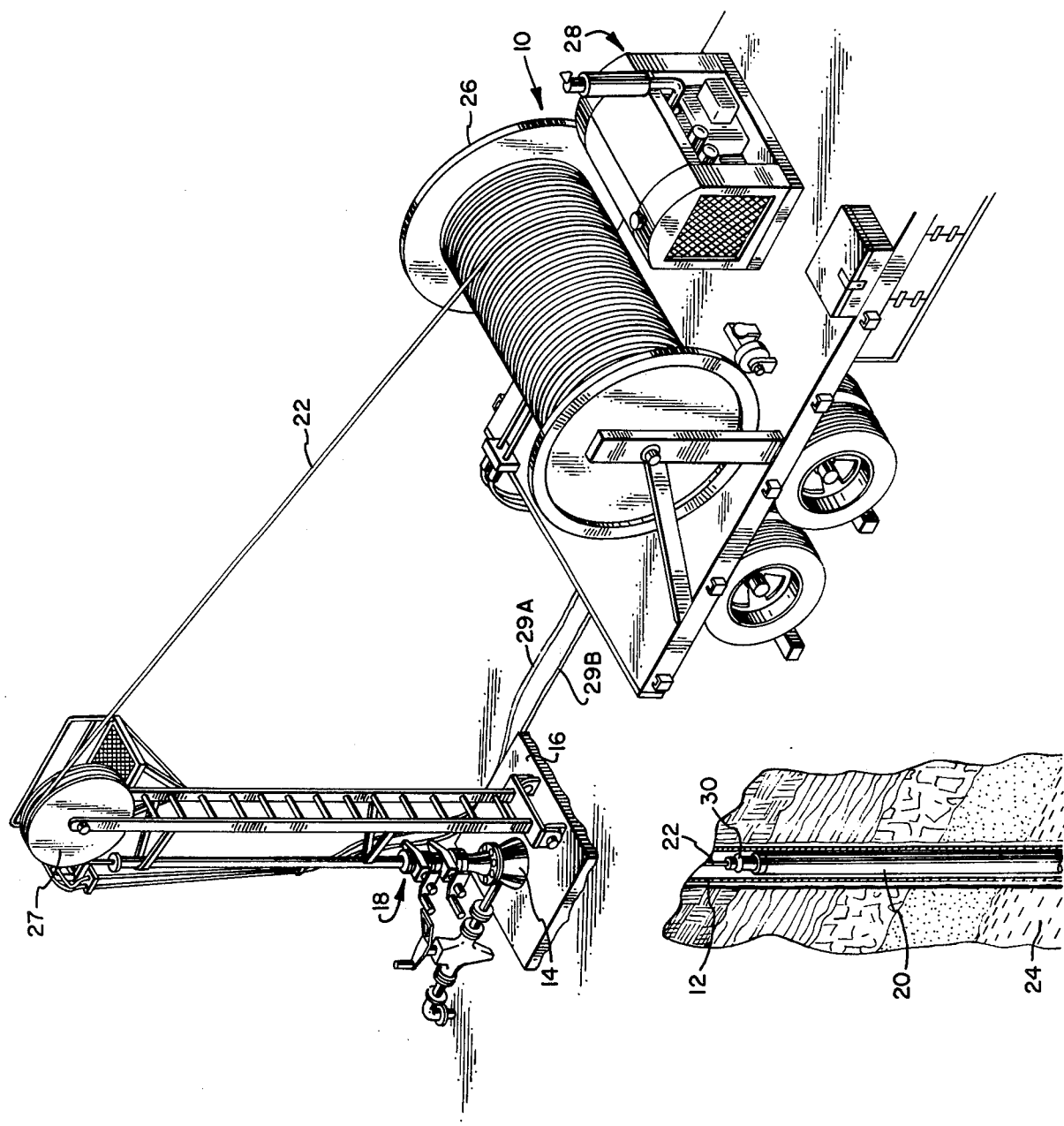
FIG. 1 is a perspective view which illustrates installation of a submersible pump in a well bore in which the submersible pump is supported by a length of flexile production tubing.

In the description which follows, like parts are marked throughout the specification and drawings with the same reference numerals, respectively. The drawings are not necessarily to scale and in some instances proportions have been exaggerated in order to more clearly depict certain features of the invention.

Referring now to FIG. 1, a pump installation rig 10 is set up adjacent a well site in which a well casing 12 is terminated by a well head flange 14 and is anchored to a concrete block 16 in the usual manner. A slip and packer assembly 18 extends above the lower flange 14. Extending through the slip assembly and into the bore of the well casing 12 is a submersible pump 20 which is supported by a length of flexible production tubing 22 for recovering fluids and minerals from a producing formation 24. The pump 20 is lowered and retracted through the well casing 12 as the flexible tubing 22 is played out and taken up by a reel 25 and a hydraulically powered bull wheel 27. Control signals generated at an operator console and power station 28 are transmitted to the bull wheel through conduits 29A, 29B. The flexible production tubing 22 is attached to the upper end of the pump 20 by means of a connector assembly 30, as set forth in co-pending U.S. application Ser. No. 150,615, filed May 16, 1980, which is hereby incorporated by reference.

The flexible tubing assembly 22 is an integrated assembly of a relatively large diameter core tube 32 which serves as the production conduit, and a pair of relatively small diameter auxiliary hydraulic conduits 34, 36 for circulating hydraulic fluid from a surface reservoir facility to the downhole pump for heat transfer and filtering purposes. Additionally, the integrated flexible tubing assembly includes electrical conductors 38, 40 and 42 for conducting electrical power from a surface facility to drive a downhole electrical motor.

Figure 3:
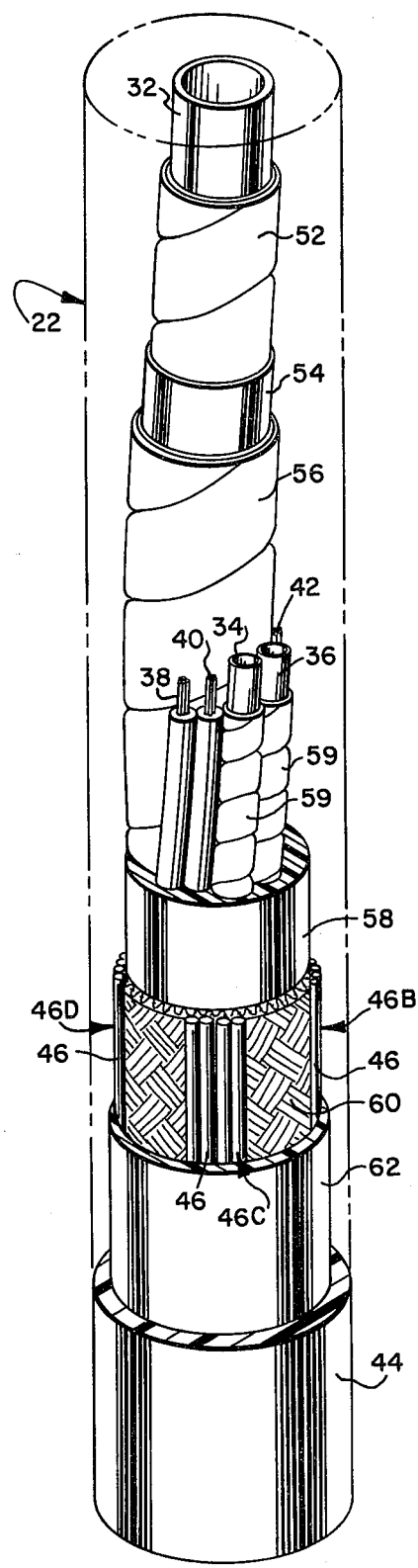
FIG. 3 is a cutaway perspective view of flexible production tubing.
Figure 4:
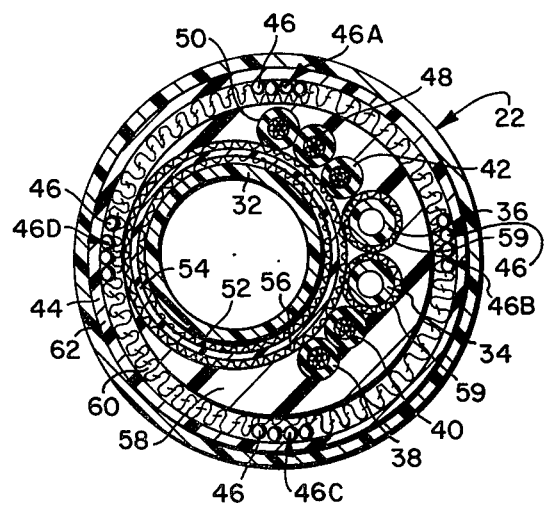
FIG. 4 is a sectional view of the flexible production tubing of FIG. 3.

Referring now to FIGS. 3 and 4, the flexible production tubing 22 includes a flexible production core conduit 32 enclosed within a flexible, high tensile strength tubular outer sheath 44 and four groups 46A, 46B, 46C, 46D of flexible, high tensile strength strands 36. The outer sheath 44 preferably comprises a high strength durable material such as nylon or Teflon polymer. Teflon polymer is preferred for high temperature, corrosive environment usage. The load-bearing, high tensile strength strands 46 which comprise each group are preferably a synthetic fibrous material such as aromatic polyimide, sold under the trademark Nomex or Kevlar by Dupont. The flexible load-bearing strands 46 extend axially along the length of the tubing assembly and are located intermediate the outer protective, load-bearing sheath 44 and the core production conduit 32.

Disposed in spiral or helical wrap relation around the production core tube 32 are the pneumatic/hydraulic conduits 34, 36 and power conductors 38, 40, 42 and 48 and a signal conductor bundle 50. It should be understood that, in the trade, it is customary to use the expression "spiral wrap" when referring to this type of wrapped assembly, which, strictly speaking, is one of helical wrapping. Insofar as the production core tube 32 is generally cylindrical, the wrap will be helical, and insofar as it is tapered, the wrap will be spiral.

Disposed intermediate the core conduits 32 and the wrapped array of power conductors and pneumatic/hydraulic conduits, are a first wrap of a polyester ribbon material 52, which is received within a nylon sheath 54, and a second layer 56 of polyester ribbon, which is wrapped in a partially convoluted, spiral path about the nylon sheath 54. The power conductors 38, 40, 42 and 48 and pneumatic/hydraulic conduits 34, 36 are stabilized against the wrapped core conduit 32 by an injection body 58 of polyester filler material which is injected into the annulus surrounding the wrapped core conduit 32 under the application of heat and pressure. In addition to improving burst strength, the injection body 58 shields the core conduit 32 and the pneumatic/hydraulic conduits 34, 36 with respect to shear forces which would pinch or otherwise restrict flow through the conduits. The pneumatic/hydraulic conduits 34, 36 are wrapped with a layer 59 of a polyester ribbon material to improve burst strength.

Immediately surrounding the injection body 58 is a braided sheath 60 of polyester fiber strands which further improves the burst strength of the assembly. The braided sheath 60 is encased within a relatively thin-gauged nylon sheath 62 which is, in turn, encased within the relatively heavy-gauge, high tensile strength nylon sheath. The Kevlar strands 46 are preferably interwoven or otherwise bonded, for example by an adhesive deposit, to the braided sheath 60.

Figure 2:
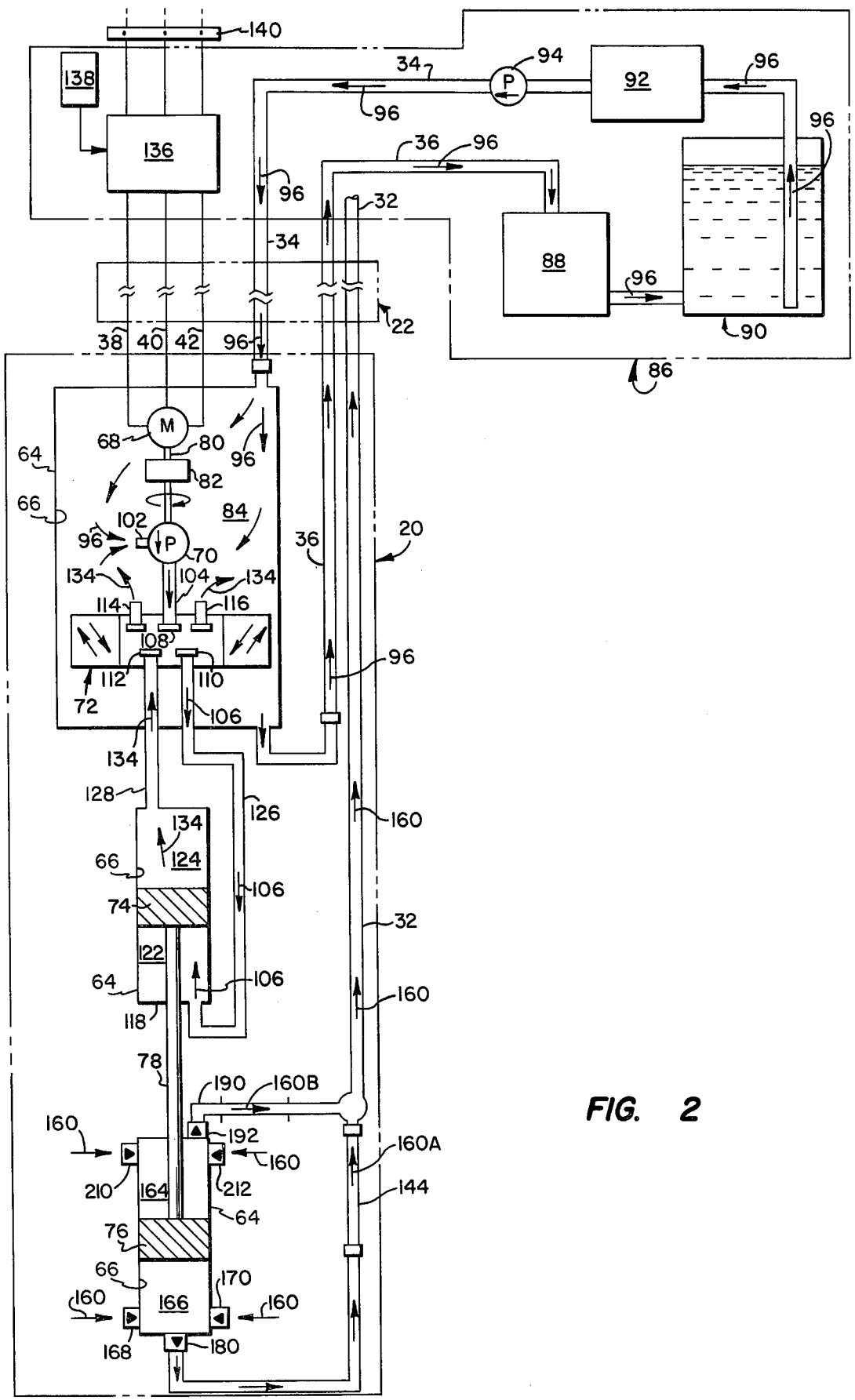
FIG. 2 is a simplified schematic view of a flexible tubing production system.
Figure 5:
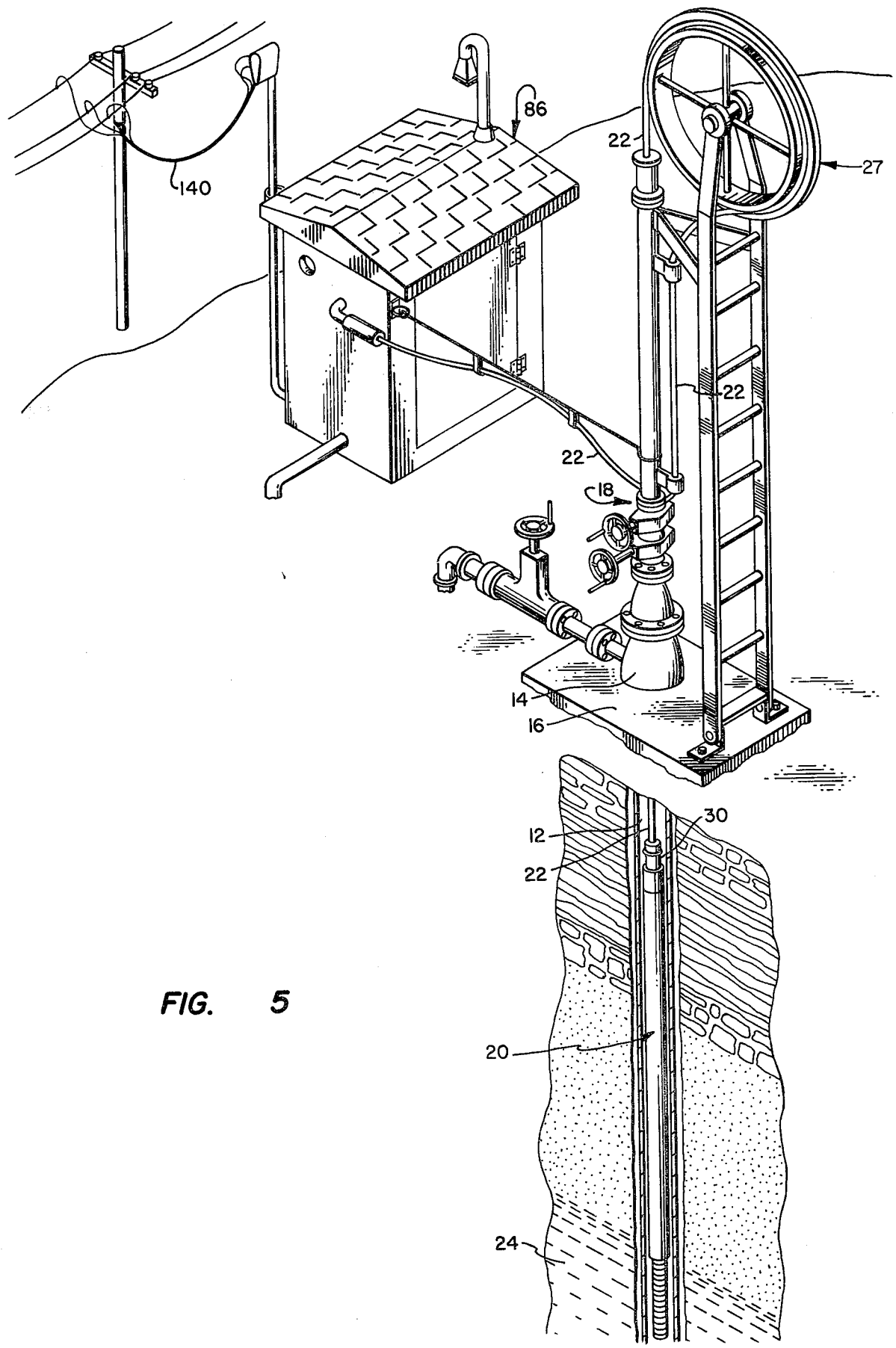
FIG. 5 is a perspective view, partly cutaway, of a completed flexible tubing production system as installed in a well bore.

Referring now to FIGS. 2, 4 and 5, it will be seen that the production core conduit 32 is disposed along a helical or undulating path, and that the power conductors and pneumatic/hydraulic conduits are wrapped in a helical or spiral path around the core conduit 32. According to this arrangement, tension loads imposed upon the flexible tubing assembly will be applied to the outer sheath 44 and the Kevlar strands 46. Incidental tension loading of the core conduit 32 and of the power conductors and pneumatic/hydraulic conduits is relieved because of the relatively greater tubing length of the inner components as compared with the length of the outer sheath 44 and Kevlar strands 46.

Referring now to FIG. 2, the pump 20 includes an elongated, cylindrical pump housing 64 having a bore 66 in which the component parts of the pump are received. The principal components received within the pump housing are an electrical drive motor 68, a hydraulic pump 70, a hydraulic shuttle valve 72, a power piston 74, a production piston 76, and a tubular connecting ram 78 which interconnects the power piston and production piston.

The electric motor 68 is preferably a three-phase electrical induction motor which is energized by three-phase electrical power conducted through the power conductors 38, 40 and 42 from a surface facility. According to a preferred embodiment, the electric power is conducted at a relatively high frequency, for example, 400 Hz and the electrical motor 68 turns at a substantially constant, relatively high rpm, for example 12,000 rpm. Because of the relatively high rpm, it is necessary to reduce the rpm to a lower level within the operating range of the pump 70. Accordingly, the rotor of the electric motor 68 is connected via shaft 80 to a gear reduction drive assembly 82 having a gear ratio of 6:1, whereby its output is 2000 rpm.

According to an important feature of the invention, the housing of the electric motor 68 is provided with fluid flow passages through which the spent power fluid is circulated for heat transfer and lubrication purposes. Additionally, the gear 82 is also provided with fluid flow passages for heat transfer and lubrication purposes.

The pump 70 and valve 72 are received within a chamber 84 which serves as a reservoir for spent power hydraulic fluid. According to an important feature of the invention, the spent power hydraulic fluid is circulated to a surface facility 86 and through a filter 88, a primary reservoir 90 and a heat exchanger 92, by a surface mounted hydraulic pump 94.

Spent hydraulic power fluid 96 is circulated to and from the surface facility 86 through the auxiliary hydraulic conduits 34, 36. In the surface facility, the hydraulic power fluid 96 undergoes filtering and heat exchange prior to being returned downhole. The pump 94 circulates the spent hydraulic power fluid 96 at a rate, for example, two gallons per minute, which will ensure adequate heat transfer for sustained operation of the electric motor 68 and pump 70 at high power levels.

The pump 70 is provided with an inlet port 102 and a discharge port 104. As the pump is driven in response to rotation of the shaft 80, spent hydraulic power fluid 96 is withdrawn from the reservoir 84 into the inlet port 102 and is discharged under pressure into the valve 72 through the outlet port 104. The pressurized hydraulic fluid produced by the pump 70 is used to drive the power piston 74 reciprocally through the bore 66. High pressure hydraulic flow is indicated by the arrow 106.

The valve 72 is an automatic shuttle valve which is responsive to the build-up of back pressure to shuttle flow from its high pressure inlet port 108 to a first outlet port 110 and subsequently to a second outlet port 112. The valve 72 is also furnished with first and second return circulation ports 114, 116 which empty into the reservoir 84.

In operation, high pressure power fluid 106 is directed through the outlet port 110 of the valve 72 and through the conduit 126 to drive the power piston 74 vertically upwardly through the power cylinder 118. Hydraulic fluid in the upper power chamber 124 is circulated outwardly, as indicated by the arrows 134, through the conduit 128 into the port 112 and then through the return circulation port 114, where it re-enters the reservoir 84 at a relatively low pressure. Upon reversal of the shuttle valve 72, the flow of power fluid is reversed, with the high pressure power fluid 106 being ported into the upper power chamber 124, and the hydraulic fluid in the lower power chamber 122 being circulated through port 110 and port 116 into the reservoir 84. Thus, the lower and upper power chambers 122, 124 are alternately pressurized and relieved, thereby driving the piston 74 and connecting ram 78 reciprocally through the power cylinder 118.

It will be observed that the prime mover for this arrangement is the electrical motor 68, which is powered by electrical current conducted downhole from the surface facility 86 through the conductors 38, 40 and 42. Moreover, the hydraulic power for driving the piston 74 is developed downhole by the pump 70 which is driven by the electrical motor 68. The relatively low pressure hydraulic power fluid 96 in the reservoir 84 is circulated to the surface facility solely for purposes of filtering and heat exchange as previously discussed.

This is in contrast with prior art pumping systems in which a surface facility pump develops the hydraulic pressure for driving a downhole motor. It will be appreciated that the present arrangement can be used at relately greater depths, with the hydraulic pressure drop associated with long conduits being avoided, since the operating pressure is developed downhole. There is, of course, a pressure drop along the hydraulic conduits 34, 36; however, more than adequate pressure for circulating the hydraulic power fluid through the motor 68, transmission 82 and pump 70 for heat exchange and lubrication purposes can be developed by the surface pump 94.

Upon entering the pump assembly 20, the filtered hydraulic power fluid 96 is circulated through heat transfer passages in the electric motor 68, as previously discussed. The hydraulic power fluid 96 is circulated through heat transfer and lubrication passages in the gear assembly 82 and is accumulated within the reservoir chamber 84 where it awaits intake by the pump 70. Spent power fluid 134 returned from the power cylinder 118 is discharged from the valve 72 into the reservoir 84, where it intermingles with the filtered and temperature controlled hydraulic power fluid 96.

According to the foregoing circulation arrangement, the relatively low pressure hydraulic power fluid 96 is circulated freely in heat exchange and lubricating relation with the electric motor 68, the gear assembly 82 and the pump 70. It will be appreciated that the circulation of the spent hydraulic fluid 96 is carried out in a closed circulation system, which is maintained at a higher pressure relative to the produced formation fluid, thereby preventing contamination of the spent hydraulic power fluid by the formation fluid. This operation at high power levels can be sustained without excessive build-up of heat in the pump assembly.

The pump 20 is set in motion by conducting three phase electrical power through the conductors 38, 40 and 42, which are carried in the flexible production tubing 22 to the pump 20. The motor is connected in driving relationship with the pump 70, either directly or through the gear drive unit 82. When the gear drive unit is employed, the motor 68 is preferably operated at a high speed by operating power supplied at a constant high frequency, for example 400 Hz, thereby reducing power losses in the conductors. If desired, however, the speed of the motor can be controlled through a cycloconverter 136. The cycloconvertor 136 is a static frequency converter having a variable frequency output for controlling the speed of rotation of the electric motor 68. The operating speed is adjusted at an operator console in the surface facility 86. Operating power for the cycloconverter 136 is derived from AC service mains 140 as shown in FIGS. 2 and 5. According to this arrangement, the rotor speed of the electric motor 68 is continuously variable over a wide operating range, whereby the stroke of the power piston can be adjusted from time to time to accommodate changes in the producing formation.

High pressure hydraulic fluid 106 is discharged from the pump 70 as it is driven by the motor 68. This high pressure hydraulic power fluid flow is switched automatically from the upper power chamber 124 to the lower power chamber 122 of the power cylinder 118, thereby driving the power piston 74 in extension and retraction. As the power piston 74 is extended, hydraulic fluid in the lower power chamber 122 is circulated through the return conduit 126, as high pressure hydraulic fluid is discharged into the upper power chamber 124. On the upstroke, as the power piston 74 is retracted, high pressure hydraulic fluid is forced downwardly through the conduit 126 and into the lower pressure chamber 122, as the hydraulic power fluid in the upper chamber 124 is forced upwardly through the conduit 128 and is circulated into the reservoir 84.

The reciprocal motion of the power piston 74 is transmitted to the production piston 76 through the tubular ram 78. Formation fluid 160 is admitted into the lower pump chamber 166 through check valves 168, 170, and formation fluid 160B is produced through the upper check valve 192 as the piston 76 is retracted. When piston 76 is extended, the upper chamber 164 is pressurized through the check valves 210, 212, while the lower chamber is relieved as formation fluid 160A is produced through the lower check valve 180. The produced formation fluid is conveyed by delivery conduits 144, 190 which are coupled to the flexible production conduit 32.

It will be appreciated that a large quantity of heat will be generated by the electric motor 68, the gear drive 82 and the pump 70. Accordingly, the power hydraulic fluid 96 is continuously circulated through the motor housing, and the gear housing and the pump are immersed within the hydraulic power fluid in the reservoir 84. The hydraulic power fluid 96 is continuously circulated through a filter 88 and a heat exchanger 92 by the pump 94, all of which are located in the surface facility 86. The rate of heat transfer in the heat exchanger unit 92 is preferably adjustable to maintain the electric motor, hydraulic pump and shuttle valve at a safe operating temperature, while using the circulation of the spent power fluid through the flexible production tubing to heat the produced formation fluid slightly to maintain dissolved paraffin in solution, thus avoiding the buildup of paraffin on the walls of the production conduit 32. The distributed heating effect of electrical current passed by the conductors 38, 40 and 42 is also useful in this regard.

It will be appreciated that the flexible production tubing 22 may include additional auxiliary conduits for performing other down-hole operations. For example, auxiliary conduits may be provided for injecting scale inhibitors into the pump. Auxiliary conduits can be used to seat hydraulic/pneumatic packers. Acid mixtures can be pumped through auxiliary conduits to backwash casing perforations below the packer. Water may be injected through auxiliary conduits for the generation of steam down-hole.

Because the hydraulic drive power is developed downhole, the flexible tubing production system has increased pumping power for use in very deep wells. Moreover, the electric motor and pump are lubricated and cooled by the circulation of the spent hydraulic power fluid, thereby enabling the unit to be operated at relatively high power levels. The electrically powered, hydraulic piston pump 20, when powered through the cycloconverter 136, is continuously variable in stroke speed to accommodate changing formation conditions.

What is claimed is:

1. A pumping system for producing formation fluid from a well comprising, in combination:

a submersible pump having a power fluid reservoir, a housing enclosing a hydraulic power cylinder and a production cylinder;

a hydraulic power pump mounted in said housing having an inlet port in communication with the power fluid reservoir and a discharge port;

a shuttle valve having an inlet port connected to the pump discharge port and an outlet port connected in fluid communication with said power cylinder for alternately pressurizing and relieving the power cylinder, said shuttle valve having a return circulation port in communication with said reservoir for conveying power fluid out of the power cylinder as it is relieved;

an electric motor disposed for heat exchange with power fluid circulated through said reservoir and mechanically coupled to said hydraulic power pump for driving said power pump in response to electrical power conducted downhole from a surface facility;

a length of flexible, composite production tubing extendable into the well and which can be wound and unwound from a reel, said composite production tubing including a tension load bearing component for supporting said pump in the well, a production conduit component coupled to said production cylinder for conveying formation fluid produced by said pump, an electrical power transfer component coupled to said motor for supplying operating power from an external power source to said motor, and a hydraulic supply conduit and a hydraulic return conduit coupled to the power fluid reservoir for conveying hydraulic power fluid to and from a surface facility; and, a surface facility including a pump and a heat exchanger connected in series fluid circuit relation with said supply and return conduits for circulating hydraulic power fluid through said power fluid reservoir and for transferring heat from said electric motor, respectively.

* * * * *